Patented May 2, 1933

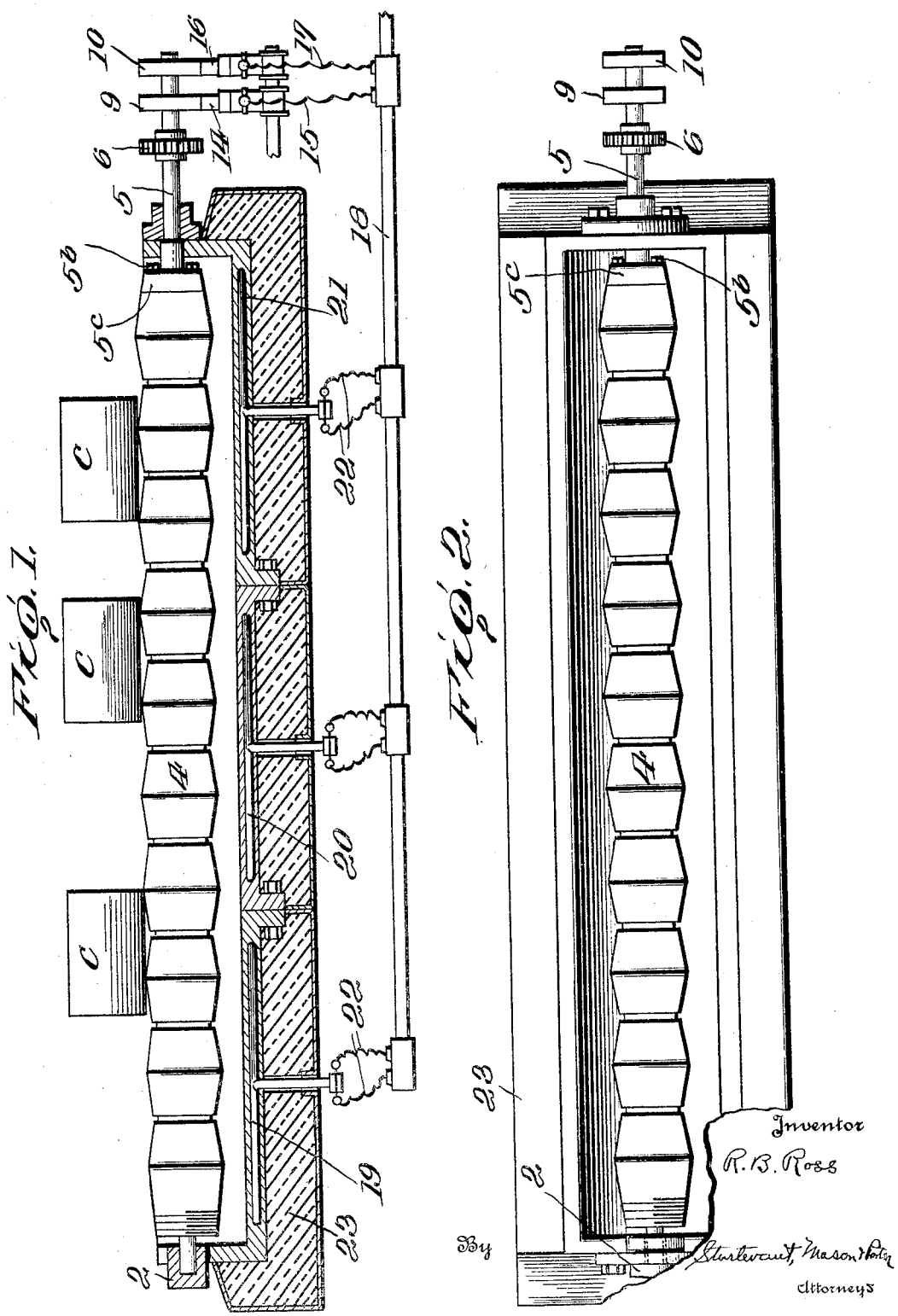

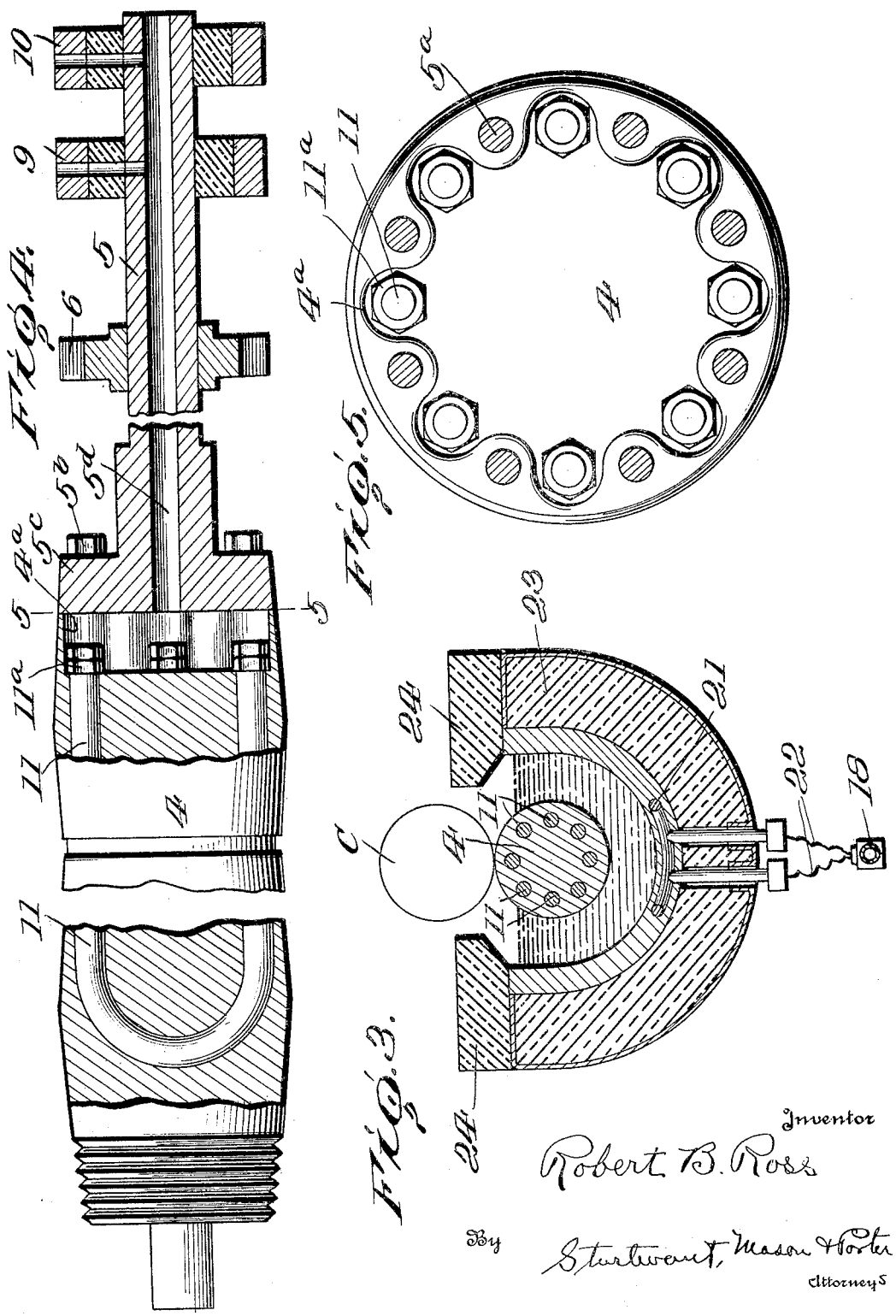

1,907,390

UNITED STATES PATENT OFFICE

ROBERT B. ROSS, OF OAK PARK, ILLINOIS, ASSIGNOR TO CONTINENTAL CAN COMPANY, INC., OF NEW YORK, N. Y., A CORPORATION OF NEW YORK

CAN BODY SIDE SEAM SOLDERING MECHANISM

Application filed November 12, 1930. Serial No. 495,228.

The invention relates to new and useful improvements in a soldering mechanism and more particularly to a soldering mechanism for applying solder to the side seam of a can body.

It has been a common expedient to provide a solder bath which is kept in molten condition by heat applied to the walls of the tank containing the solder bath and to rotate a roll partly submerged in the solder bath for applying solder to the side seam of a can body moved in an endwise direction along said soldering roll.

An object of the invention is to provide a more efficient means for maintaining the solder on the solder roll in proper molten condition for applying to the side seam through the aid of heat directly applied to said solder roll.

A further object of the invention is to provide a soldering mechanism of the above type wherein the solder roll is heated by an electric element in the solder roll.

A still further object of the invention is to provide a soldering mechanism of the above type wherein electric heating units are associated with the walls of the tank for heating the solder bath within the tank.

These and other objects will in part be obvious and will in part be hereinafter disclosed.

In the drawings which show by way of illustration one embodiment of the invention:

Fig. 1 is a vertical sectional view through a solder applying mechanism embodying the improvements.

Fig. 2 is a plan view of the tank and the soldering roll mounted therein.

Fig. 3 is a vertical sectional view through the tank showing heat insulating members applied to the tank for preventing radiation losses.

Fig. 4 is an enlarged longitudinal sectional view of the solder roll with a portion thereof broken away.

Fig. 5 is a sectional view on the line 5—5 of Fig. 4.

The invention is directed to a solder applying mechanism which includes a tank in which the solder to be applied to the side seam is kept in a molten condition. Extending lengthwise of the tank is a solder applying roll which is partly immersed in the solder. The cans are fed in an endwise direction, longitudinally of the solder applying roll and the solder taken up from the bath by the rotating roll is applied to the side seam by direct contact therewith. This is a well known type of solder applying means for soldering the side seam of can bodies.

The present invention has to do particularly with the means for heating the solder. The solder roll is equipped with electric heating units. These units are embodied within the roll and are suitably connected to a power current so that connection is maintained therewith during the rotation of the roll and the heating units thus continuously apply heat to the solder applying roll.

The tank is supplied with heat insulating material and preferably imbedded in the wall of the tank are electric heating units for heating the tank, and thus it is that the solder is reduced to molten condition and the solder roll as it rotates carries the solder up to the side seam.

Referring more in detail to the drawings the invention is embodied in a solder applying mechanism which includes a tank 1 provided with suitable bearings 2 and 3 in which is mounted a solder roll 4. This solder roll 4 extends lengthwise of the tank and has a shaft 5 attached thereto which extends beyond the end of the tank and a sprocket wheel 6 secured to the shaft serves as a means for imparting rotation to the solder roll. The means for driving the sprocket wheel has not been shown as this may be of any usual form. The shaft extends slightly beyond the sprocket wheel and on the end of the shaft are two commutators 9 and 10.

Within this solder applying roll are a series of electric heating units 11, 11. Within the shaft is a conductor 12 which is connected to the commutator 9 and also a conductor 13 which is connected to the commutator 10. There is a brush 14 associated with the commutator 9 and this is connected to a power line 15. There is also a brush 16 associated with the commutator 10 and this is connected to a power line 17. The power lines 15 and 17 are connected to a suitable cable 18 and thus it is that current is continuously supplied to these electric heating units located within the solder applying roll 4.

Referring again to the construction of the solder roll and the heating elements or units therefor, as shown, there are four heating units 11. These heating units are U shaped and they are cast in place in the forming of the solder roll. The ends of the heating units projecting into a recess 4a at the end of the solder roll are provided with suitable terminal nuts 11a. The shaft section 5 is secured to the end of the roll by bolts 5a. Nuts 5b are threaded on the ends of these bolts and clamp the head 5c to which the shaft 5 is attached to the end of the roll. The shaft 5 has a central opening 5d therethrough. The commutators 9 and 10 are in the form of metal rings insulated from the shaft 5 and apertures or openings are formed down through the insulation and the shaft so that conductors 13 may be led from the commutators through the opening in the shaft into the recess 4a and there attached to the electric heating units. These heating units are located very close to the periphery of the solder roll and therefore the solder roll may be very quickly heated and the solder in contact therewith, which greatly facilitates the easy and quick starting of the machine.

The tank 1 is preferably constructed so that electric heating units 19, 20 and 21 are imbedded in the wall of the tank. These heating units are connected to conductors 22, 22 to the cable 18 and thus it is that these heating units in the wall of the tank are utilized for heating the tank and the solder contained in the tank. The tank is preferably provided with a heat insulating material 23 which extends all the way around the tank covering the outer face thereof. Heat insulating members 24, 24 are also provided at the upper edges of the tank and constructed so as to slightly overhang the bath and these members greatly reduce the extent of heat radiation from the molten solder.

A can is indicated diagrammatically in Figs. 1 and 3 at C. The cans move in an endwise direction lengthwise of the roll. They are supported by a suitable guiding horse and are moved along the same by conveying means which may be of any desired character. The manner of supporting the cans and conveying the same along the soldering roll forms no part of the present invention and has not been shown in detail.

From the above it will be noted that means has been provided for heating the tank and solder bath. This is accomplished by the heating units imbedded in the wall of the tank and therefore the solder within the tank will be quickly heated. These heating units may be graduated from one end of the pot or tank to the other so as to maintain a substantially uniform temperature throughout the entire bath of molten solder. The heating units in the solder applying roll maintain a proper temperature for maximum efficiency in soldering with the solder taken up by the solder roll and applied to the side seam. In effect, this is where the working heat is applied to the solder, which is cooled through contact with the cans as they pass along the same and which is further cooled by radiation due to the thin film of solder which is taken up by the solder roll. The insulation on the outer walls of the tank and overhanging the bath greatly reduce the heat radiation. By providing these independent heating units for the tank and the roll, a higher roll temperature may be provided than pot temperature. This greatly increases the efficiency of the entire soldering machine and reduces to a minimum the cost of maintaining the solder in proper molten condition for soldering.

It is obvious that minor changes in the details of construction may be made without departing from the spirit of the invention as set forth in the appended claims.

Having thus fully described the invention, what is claimed as new and is desired to be secured by Letters Patent is:

1. A solder applying mechanism including in combination, a tank, means for maintaining a bath of molten solder therein, a rotatable solder applying roll extending lengthwise of the tank and partly immersed in the solder bath, and means for applying heat to the solder applying roll from the interior of the solder roll.

2. A solder applying mechanism including in combination, a tank, means for maintaining a bath of molten solder therein, a rotatable solder applying roll extending lengthwise of the tank and partly immersed in the solder bath, and means disposed within the solder roll for applying heat thereto, said means being disposed close to the inner periphery of the solder applying roll.

3. A solder applying mechanism including in combination, a tank, means for maintaining a bath of molten solder therein, a rotatable solder applying roll extending lengthwise of the tank and partly immersed in the solder bath, and electric heating elements disposed within the solder applying roll for heating the periphery thereof for aiding in maintaining the solder in the molten condition in the region adjacent the solder applying roll.

In testimony whereof I affix my signature.
ROBERT B. ROSS.